UNITED STATES PATENT OFFICE.

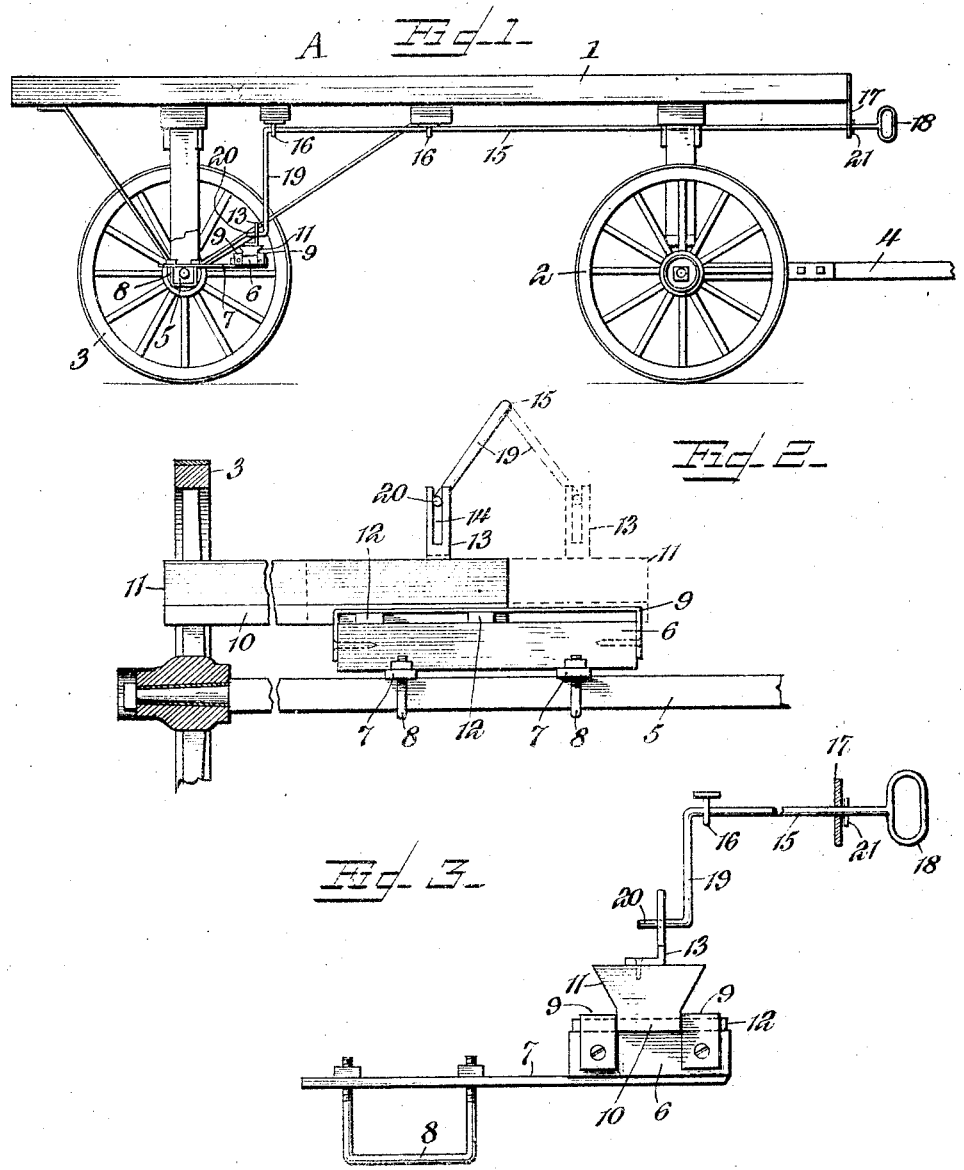

CHARLES O. LARSON, OF DE KALB, ILLINOIS.

BAGGAGE-TRUCK HOLDER.

1,381,650.   Specification of Letters Patent.   Patented June 14, 1921.

Application filed May 15, 1919. Serial No. 297,387.

*To all whom it may concern:*

Be it known that I, CHARLES O. LARSON, a citizen of the United States, residing at De Kalb, in the county of De Kalb and State of Illinois, have invented a new and useful Baggage-Truck Holder, of which the following is a specification.

This invention has reference to baggage truck holders, and its object is to provide means for preventing a railroad truck from moving from the position in which it may be left and so become liable to damage, especially in the event of moving upon the railroad track and thus being hit by a passing train.

Railroad trucks are customarily four-wheeled vehicles with a platform upon which trunks or other articles are placed for transportation about a railway station. Such trucks are not usually provided with brakes and are usually allowed to stand upon the station platform when not in use, or when waiting, with or without a load, for movement to some other position. If the platform be somewhat out of level there is always the liability of the truck gravitating toward a lower point, or if there should occur a relatively strong wind the truck may be started and propelled by the wind and is frequently moved for a sufficient distance and in a suitable direction, without intention on the part of an operator, to run upon the railway tracks into the path of a train, this usually resulting in the destruction of the truck and sometimes causing serious accidents.

The invention comprises a positive holder or lock for wheels of the truck, which holder or lock is readily moved from the front end of the truck and so with very little effort may be made to lock the truck far more reliably than is the case with brakes, which latter, if used, may be indifferently operated and so be quite unreliable.

The invention will be best understood from a consideration of the following detailed description taken in connection with the accompanying drawing forming part of this specification, with the understanding, however, that the invention is not confined to any strict conformity with the showing of the drawings, but may be changed and modified so long as such changes and modifications mark no material departure from the salient features of the invention as expressed in the appended claims.

In the drawing:—

Figure 1 is a side elevation of a truck equiped with the invention, with some parts broken away to disclose more distant parts.

Fig. 2 is an elevation, with some parts in section, of the invention as applied to the rear axle of the truck and indicating different positions in solid and dotted lines.

Fig. 3 is a side elevation of the structure embodying the invention, but omitting those portions of the truck shown in Fig. 2.

Referring to the drawing, there is shown a baggage truck A of the usual railway type, and comprising a platform 1, front and rear wheels 2 and 3 respectively, a tongue 4, a rear axle 5, and other parts common to such trucks but needing no special mention.

There is provided a bed strip 6 which may be conveniently formed of wood and this strip has bars 7 each fast to it at one end of the bar. Each bar 7 is of metal carrying at the end remote from the strip 6 a clip or U-bolt 8 by means of which the bar 7 may be firmly secured to the axle 5. The bars 7 are located near respective ends of the strip 6 to hold the strip 6 in spaced but relatively rigid relation to the axle 5.

Extending lengthwise of the strip 6 are guide straps 9 spaced apart widthwise of the strip 6, and lodged between the guide straps is a tongue extension 10 of a lock bar 11, the tongue extension having laterally projecting lugs 12 underriding the guide straps 9. There are two such lugs 12 projecting on opposite sides of the tongue 10 so as to securely hold the lock bar 11 onto the strip 6 in sliding relation thereto. The parts are so related and so positioned that the lock bar 11 has a range of movement to cause it to enter between two adjacent spokes of the wheel 3 or to be withdrawn toward the mid-portion of the truck in ample distance from the wheel to allow free turning of the latter.

Erected on the lock bar 11 is a bracket 13 having a longitudinal slot 14 which may be open at the upper end. Carried by and beneath the platform 1 of the truck is a rod 15 mounted in clips or other suitable supports 16 under the platform 1 and carried through a guide 17 at the front of the platform and terminating in a handle 18 readily accessible to the operator of the truck. The other or rear end of the rod 15 is shaped into a crank 19 having a terminal portion 20 suitably bent to extend through the slot 14.

Ordinarily, the rod 15 is so rocked that the lock bar 11 is moved away from the wheel 3, wherefore the truck may be moved from place to place as desired. When, however, the truck is to be left unattended the handle 18 is turned and the lock bar 11 projected between two adjacent spokes of the wheel 3. This effectively locks the truck and holds it against all customary forces which may tend to move the truck so that there is no liability of accidental movement of the truck onto the railway tracks to be demolished by a passing train.

The invention is readily applicable to the customary type of railway trucks now in use as an addition thereto without any change in structure of the truck. The crank 19 holds the rod 15 from forward movement while a pin 21 traversing the rod 15 in front of the guide 17 prevents rearward movement of the rod.

What is claimed is:—

1. A holding means for baggage trucks comprising a lock bar movable between and from between the spokes of one of the truck wheels, a support for the lock bar, means for connecting the support to the rear axle of the truck, and a crank rod connected to the lock bar for moving the same longitudinally, said crank rod extending to the front of the truck and there provided with means whereby it may be rocked on its longitudinal axis to project the lock bar between the spokes of the wheel and withdraw it therefrom, the entire holding means maintaining itself in any position whether locking or unlocking with no tendency to move from said position.

2. A locking attachment for baggage trucks comprising a slidable lock bar for movement between spokes of one of the rear wheels of the truck, a strip having guides thereon in spaced relation with the lock bar, the lock bar having a tongue engaging between the guides, and lugs for engaging the guides, clips for engaging the rear axle of the truck, and bars carrying them and fast to the carrying strip for the lock bar, and a rockable device of a length to extend to the front of the truck and engaging the lock bar to slide the latter longitudinally into and out of engaging relation with a rear wheel of the truck.

3. A baggage truck provided with forwardly extending bars, and clips thereon engaging the rear axle of the truck, a carrier secured to the bars forward of the rear axle, a lock bar mounted on the carrier and provided with a tongue next to the carrier and with lugs projecting laterally from the tongue, guide strips fast on the carrier on opposite sides of the tongue and overriding the lugs to guide and hold the lock bar on the carrier, and means engaging the lock bar and extended to the front of the truck for moving the lock bar laterally of the truck into and out of engagement with an adjacent rear wheel of the truck.

4. A baggage truck provided with forwardly extending bars, and clips thereon engaging the rear axle of the truck, a carrier secured to the bars forward of the rear axle, a lock bar mounted on the carrier and provided with a tongue next to the carrier and with lugs projecting laterally from the tongue, guide strips fast on the carrier on opposite sides of the tongue and overriding the lugs to guide and hold the lock bar on the carrier, and means engaging the lock bar and extended to the front of the truck for moving the lock bar laterally of the truck into and out of engagement with an adjacent rear wheel of the truck, said last-named means comprising a rod carried by the truck and terminating at the forward end of the truck in a manipulating device, with the rear of the rod formed into a crank, and a slotted bracket on the lock bar engaged by said crank.

In testimony, that I claim the foregoing as my own, I have hereto affixed my signature.

CHARLES O. LARSON.